US005298307A

United States Patent [19]

Suzuki et al.

[11] Patent Number: 5,298,307

[45] Date of Patent: Mar. 29, 1994

[54] ENGRAVING SHEET STRUCTURE

[75] Inventors: Akira Suzuki; Shoji Misonoo; Kozo Fukuda; Naoyuki Ishii, all of Tokyo, Japan

[73] Assignee: EPC Technology Co., L.T.D., Tokyo, Japan

[21] Appl. No.: 928,042

[22] Filed: Oct. 8, 1992

Related U.S. Application Data

[63] Continuation-in-part of Ser. No. 894,943, Jun. 8, 1992, abandoned.

[51] Int. Cl.[5] .................................... B32B 3/00

[52] U.S. Cl. .................................... 428/141; 428/195; 428/212; 428/483; 428/500; 428/516; 101/171

[58] Field of Search .................... 428/500, 516, 483, 212, 428/195, 141, 908; 101/171

[56] References Cited

U.S. PATENT DOCUMENTS 3,897,964 8/1975 Oka et al. .................................... 283/111

*Primary Examiner*—Edith Buffalow
*Attorney, Agent, or Firm*—Rogers & Killeen

[57] ABSTRACT

An engraving sheet structure suitable for use as sheets of, for example, a passport or a bankbook has a substrate made of a plastic sheet made of, for example, a bi-axially orientated high-density polyethylene sheet having an opacity degree not greater than 70%, and an engraving layer formed on the substrate and having an opacity not less than 40% and made of a material which contains a cross-linkable binder. The opacity of the substrate is lower than that of the engraving layer, the difference in the opacity being not less than 30. The engraving layer being adapted to be engraved to form an image from its surface down to the level of said substrate. One or more colored layer may be provided between the substrate and the engraving layer.

13 Claims, 4 Drawing Sheets

ENGRAVING SHEET STRUCTURE

Figure 1:
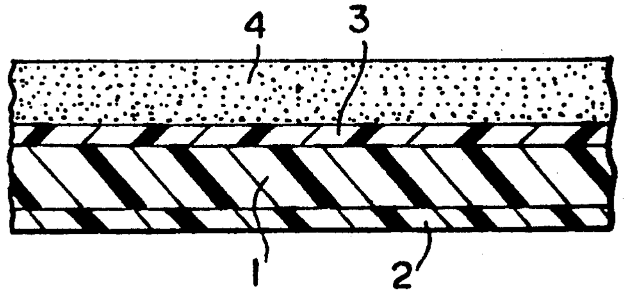

This is a continuation-in-part of application Ser. No. 894,943 filed Jun. 8, 1992, is now abandoned.

BACKGROUND OF THE INVENTION

1. Field of the Invention

The present invention relates to an engraving plastic sheet which is to be engraved by a suitable engraving means to present desired patterns or images and which is difficult to tamper, and hence, is suitable for use as a material of, for example, various types of cards, passport and bankbook.

2. Description of Related Art

Engraved plastic sheets having various patterns engraved therein have been known and used as, for example, ID cards which enable identification of individual persons. In recent years, passports made of such engraved sheets are used. Checking of examination of such engraved sheets are done by means of light reflected from the sheet and, hence, it is not easy to find any tamper of the sheets. Various types of sheets have been proposed to obviate this drawback but all these proposed sheets are still unsatisfactory.

SUMMARY OF THE INVENTION

Accordingly, an object of the present invention is to provide an engraving sheet structure which is suitable for presenting desired patterns or the like by being engraved by a suitable engraving means and which enables an easy detection of any tamper while making it difficult to tamper.

To this end, according to the present invention, there is provided an engraving sheet structure, comprising: a substrate made of a plastic sheet having opacity of 70% or less, and an engraving layer formed on said substrate and having an opacity of 40% or greater, the opacity of the substrate being always lower than that of the engraving layer and the difference in the opacity between said substrate and said engraving layer being 30% or greater, the engraving layer being adapted to be engraved to the level of the substrate.

The present inventors have found, as a result of an intense study, that an engraving sheet structure having the above-described structural features, when engraved to the level of the substrate through the engraving layer, presents a clear engraved pattern by the transmitted light. It is possible to provide, between the substrate and the engraving layer, one or more colored layer having a color or colors different from these layers. It is also possible to provide a backing layer on the reverse side of the substrate, with or without a matrix pattern layer. The pattern engraved in the engraving sheet structure of the invention can be recognized both from the same side as the engraving layer and from the reverse side of the substrate, by virtue of the transparent nature of the sheet which transmits light.

The invention will be fully described hereinunder.

The substrate is made from a suitable plastic sheet made of an ordinarily used polyethylene, polypropylene or polyester such as, polyethylene terephthalate, or polyvinylchloride, and has an opacity of 70% or less, preferably 40% or less. White sheet of polyester or polypropylene is not preferred because such white sheets exhibit high opacity. Since the engraving is done to reach the substrate, the material of the engraving layer preferably has a high degree of stiffness, as well as excellent engraving characteristic. For instance, polyester sheet or bi-axially orientated high-density polyethylene sheet. Among various types of polyethylene sheet are preferably used. A too soft material will produce dust particles during engraving. Such dust particles depositing to and remaining on the sheet are difficult to remove. A too fragile material will cause dropping of a portion of the engraved pattern, thus impairing shelving characteristic of the sheet.

Bi-axially orientated high-density polyethylene sheet is flexible but exhibits a moderate level of hardness, as well as high levels of tensile strength and toughness. This type of material also has small resistance to solvents, particularly to solvents of petroleum-, aroma-, ketone- and ester-type solvent, so that it is less liable to be tampered. Furthermore, this type of material inherently has a small bondability so that, once a coloring layer is peeled off, it can hardly be bonded again with a different type of adhesive, thus preventing any forgery.

The thickness of the sheet is suitably selected in accordance with the use. When the sheet is intended for use as the material of a passport, the sheet thickness generally ranges between 50 and 200 μm, preferably between 75 and 150 μm.

The engraving layer can be formed by preparing a coating color composed of a binder and a filler, and applying the coating color by an ordinary measure followed by drying. It is possible to use a gravure ink as the coating color. In order to facilitate coating, it is possible to add a wetting agent, a thickener or the like to the coating color. It is also possible to add an anti-static additive or other additive to the coating color. Preferably, the engraving layer has an opacity of 40% or greater. Although not exclusive, the engraving layer preferably has a thickness of 1 to 25 μm, preferably 7 to 12 μm.

There is no restriction in the binder mixed in the material of the coating color, provided that the binder exhibits high affinity to the substrate or to an undercoat layer when such an undercoat layer is used. It is, however, preferred that a cross-linkable binder is used as the main binder, for the following reason. A cross-linkable binder generally exhibits a high resistance to solvent. When the sheet is illegally treated with a solvent for a tampering purpose, the substrate is dissolved rather than the engraving layer, so that the state or appearance of the substrate is noticeably changed to clearly show that the sheet has been illegally tampered. An acrylic or an epoxy binder is suitably used as the cross-linkable binder. When the substrate is made of a polyester sheet, a polyester resin is preferably used as the binder. For attaining good shelving characteristic after the engraving, a resin having excellent abrasion characteristic, e.g., a polyester resin or a polyurethane resin, is preferably used as the binder.

The filler used in the material of the coating color may be selected from any material which can be colored to impart opaqueness to the product sheet, such as, for example, a dyestuff or pigment ordinarily used as a colorant, titanium oxide, calcium carbonate, silica or the like. From a view point of abrasion resistance, however, the filler preferably has a small particle size and is capable of impacting opaqueness with small amount of addition. From this point of view, titanium oxide can be used suitably. The titanium oxide may be used in the form of a water dispersion. There is no restriction in the color generated by the colorant, and various colors can be used including white color.

The engraving layer after the engraving may be coated or covered by, for example, a transparent resin layer laminated thereon, for the purpose of improving shelving characteristic of the engraved image.

The provision of the undercoat layer is not essential. When such an undercoating layer is used, however, the material of such layer should contain a binder which exhibits high degrees of affinity both to the substrate and the engraving layer. The undercoat layer may be transparent or opaque. In some cases, however, high degree of opaqueness of the undercoat layer is preferred in order to attain a high degree of gradation of the engraved image. In such a case, the undercoat layer also contributes to enhancement of opaqueness of the product sheet. The undercoat layer is primarily intended for improving adhesion of the engraving layer to the undercoat layer. For the purpose of preventing forgery, it is possible to use a plurality of such undercoat layers or to use a colored layer or layers as the undercoat layer or layers. Tamperproof characteristic can be further improved when the colored layer has a color different from those of the substrate and the engraving layer. It is also possible to increase anti-forgery effect by using an undercoat layer having a suitable matrix pattern. The thickness of the undercoat layer is determined in view of the overall thickness of the engraving sheet structure, but generally ranges between 1 and 10 μm. An ordinary technique such as application coating or gravure printing may be employed for forming the undercoat layer.

It is also possible to provide a backing layer on the reverse side of the substrate, for the purpose of improving printing adaptability and typing adaptability. Such backing layer is not essential and may be omitted. When such a backing layer is used, the material of the backing layer should contain a binder which exhibits high degree of affinity to the substrate. For instance, when the substrate is made of a polyethylene terephthalate sheet, polyester resin is preferably used as the binder in the material of the backing layer, whereas, when the substrate is made of a polypropylene layer, chlorinated polypropylene resin is preferably used as the binder in the backing layer material. The thickness of the backing layer generally ranges between 1 and 15 μm. Fine powder of silica is preferably used as the filler of the backing layer material, in view of low opaqueness and excellent typing characteristic.

According to the invention, the term "opacity of the substrate" is used to mean the overall opaqueness presented by the laminate of the substrate and the backing layer when such backing layer is used. The term "opacity of the engraving layer" is used to mean the overall opaqueness presented by the laminate of the engraving layer and the backing layer when such backing layer is used.

It is possible to provide a printing layer or a matrix pattern layer on the engraving layer. In such a case, engraving is conducted to penetrate such printing layer or matrix pattern layer. It is also possible to adhere a sheet to the engraving layer after the engraving, in order to prevent tamper of the product sheet.

When such a sheet is provided, the engraved pattern image is observed from the reverse side of the substrate. In such a case, the sheet provides a background of the engraved image when viewed from the reverse side of the substrate. Consequently, the contrast or difference in lightness between the coloring layer of the image and the sheet is a matter of significance. The engraved image is not clearly contrasted when the lightness of the sheet is lower than that of the colored layer. It is therefore preferred that the lightness of the sheet is higher than that of the colored layer. A too high opacity of the sheet darkness the engraved image and impairs the contrast of the same. Thus, the lightness and the opacity of the adhered sheet vary according to the color, lightness and opacity of the colored layer and, hence, cannot be definitely determined. In general, however, it is preferred that the lightness of the adhered sheet is always higher than that of the colored layer of the image, and the opacity is preferably low. The image is not easy to recognize when the adhered sheet has the same color as the colored layer forming the image. It is therefore preferred that the color of the adhered sheet, when it is colored, is different from the color of the colored layer.

As has been described, the engraving sheet structure in accordance with the present invention has a substrate, and a engraving layer which is formed directly on the surface of the substrate or indirectly through the intermediary of one or more undercoat layers. The engraving sheet structure of the present invention can have a printing layer on the engraving layer or on the reverse side of the substrate, in order to improve printing characteristic. The engraving sheet structure of the invention also may be provided with a tamperproof matrix pattern. Thus, the engraving sheet structure of the present invention can have various forms according to uses or application.

Preferred embodiments of the engraving sheet structure of the present invention will be described with reference to the drawings.

FIG. 1 is an enlarged sectional view of an embodiment of the engraving sheet structure of the present invention. FIGS. 2 to 11 are enlarged sectional views of different embodiments.

Figure 2:
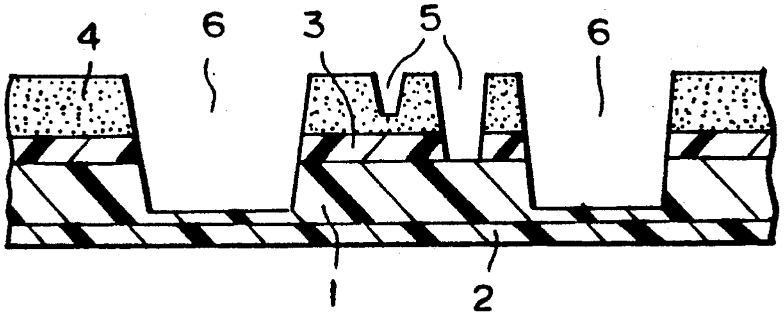

Referring to FIG. 1, an engraving sheet structure of the present invention has a substrate 1, a backing layer 2 provided on the reverse side of the substrate 1, an undercoat layer 3 provided on the obverse side of the substrate 1, and an engraving layer 4 formed on the undercoat layer 3 which serves as an intermediary layer between the substrate 1 and the engraving layer 4. In use, as shown in FIG. 2, an image 5 is formed by engraving and the background portions 6, 6 are formed by engraving the engraving layer 4 down to the level of the substrate 1. When the engraving sheet structure thus formed is illuminated from its reverse side, the engraved image can be clearly observed with a good contrast.

Figure 3:
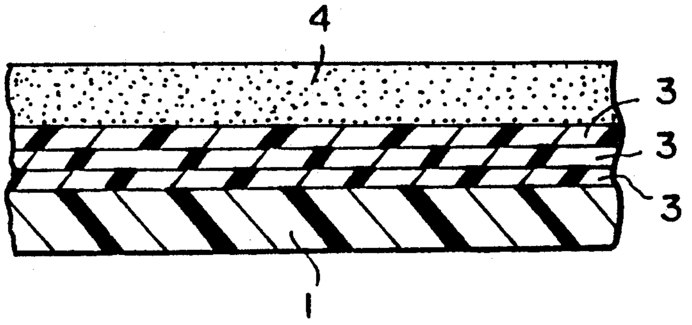

FIG. 3 shows another embodiment in which the engraving layer 4 is formed on the surface of the substrate 1 through the intermediary of three colored undercoat layers 3.

Figure 4:
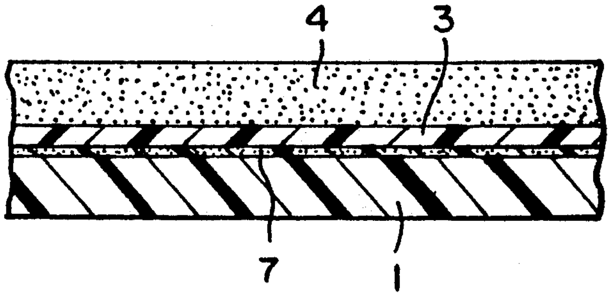

FIG. 4 shows still another embodiment in which the substrate 1 has a matrix pattern 7 printed on one side thereof, with the engraving layer 4 formed through the intermediary of a colored undercoat layer 3 formed on the matrix pattern 7.

Figure 5:
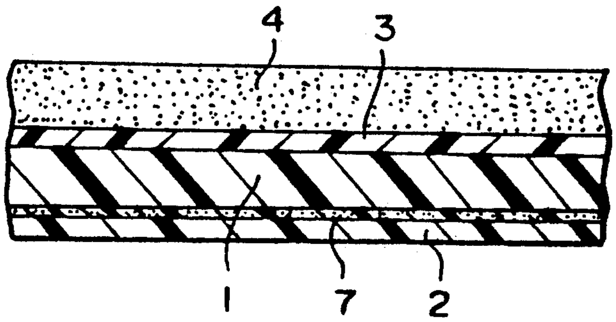

FIG. 5 shows a further embodiment in which a matrix pattern 7 is formed on the reverse side of the substrate 1 and a backing layer 2 is formed on the matrix pattern 7. The engraving layer 4 is formed on the obverse side of the substrate 1 through the intermediary of an undercoat layer 3.

The embodiments shown in FIGS. 3 to 5 are provided with engraved images as shown in FIG. 2, so that the engraved images can be clearly observed by the light transmitted through the engraving sheet structure.

Figure 6:
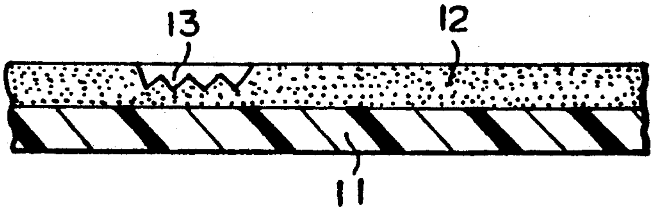

FIG. 6 shows a different embodiment which has a substrate 11 made of a plastic having an opacity of 70% or less and an engraving layer 12 formed on the substrate 11 and having an image formed by engraving therein.

Figure 7:
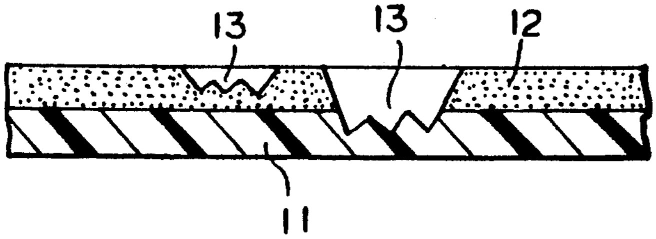

FIG. 7 shows an embodiment which is similar to that shown in FIG. 6 but having the image 13 engraved down to the level of the substrate 11.

Figure 8:
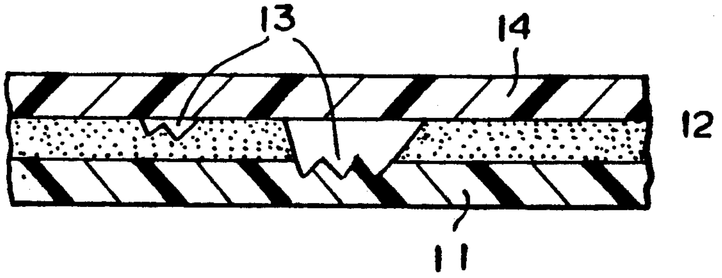

FIG. 8 shows an embodiment in which the image 13 is formed to reach the level of the substrate as in the embodiment shown in FIG. 7, with a colored sheet 14 adhered to the engraving layer 12.

Figure 9:
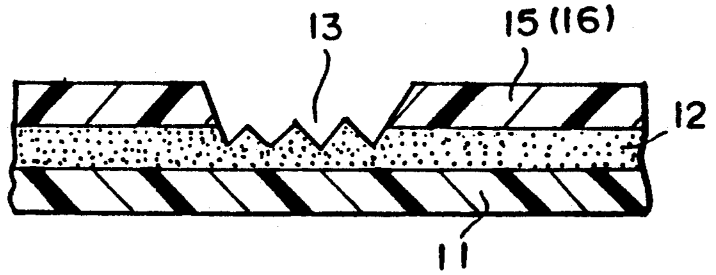

FIG. 9 shows an embodiment in which a printing layer 15 or a matrix pattern layer 16 is provided on the engraving layer 12, and the engraving is done through such printing layer 15 or the matrix pattern layer 16.

Figure 10:
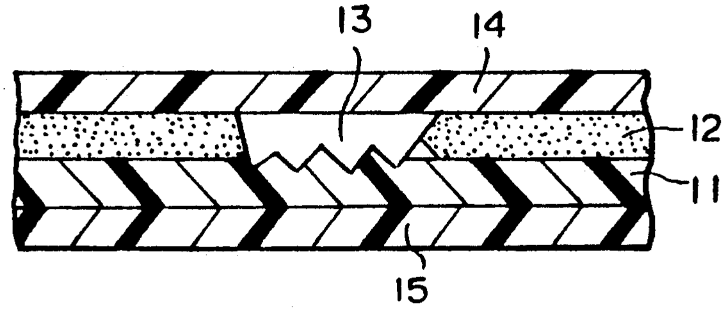

FIG. 10 shows an embodiment in which a printing layer 15 is provided on the reverse side of the substrate 11.

Figure 11:
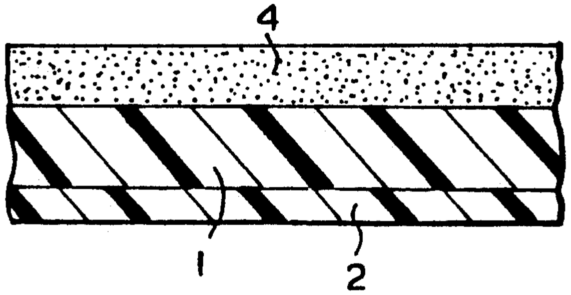

Finally, FIG. 11 shows an embodiment in which an engraving layer 4 is provided on the obverse side of the substrate 1, a backing layer 2 is provided on the reverse side of the substrate 1, as in the case of FIG. 1.

In all these embodiments, the engraving sheet structure comprises a substrate made of a plastic sheet having opaqueness degree of 70% or less, and an engraving layer formed on said substrate and having an opacity of 40% or greater, the opacity of the substrate being always lower than that of the engraving layer and the difference in the opacity between said substrate and said engraving layer being 30% or greater, the engraving layer being adapted to be engraved to the level of the substrate. Therefore, the engraved image is not easily visible with reflected light but is clearly visible with the light transmitted through the engraving sheet structure, thus preventing forgery. Furthermore, there is no risk that the engraved image comes off even when the sheet is scraped by, for example, a nail. The image shelving characteristic is further improved when the engraved color layer is overlain by another colored sheet having a different color.

Thus, the engraving sheet structure of the present invention can suitably be used as a material of documents which strictly require prevention of forgery or tamper, such as passports.

The advantages of the invention will become more apparent from the following description of Examples.

EXAMPLES

Example 1

A polyester film of 75 μm thick, with its both sides having been treated for easy adhesion, was prepared as a substrate. A coating color having the following composition was applied to the reverse side of the substrate and was dried, thus forming a sheet having a total thickness of 10 μm after the drying of the color. This sheet showed an opacity of 43%, as measured by a method specified by JIS-P-8138.

| Coating color composition | |
|---|---|
| Aqueous polyester resin (Byronal MD1200 produced by Toyo Boseki Kabushiki Kaisha) | 50 weight parts |
| Polyvinyl acetal resin KX-1 produced by Sekisui Kagaku Kabushiki Kaisha) | 10 weight parts |
| Associating thickener (10% EXP produced by Roam and Hearth Company Limited) | 5 weight parts |
| Fine powder of silica | 10 weight parts |
| Light calcium carbonate | 6 weight parts |

-continued

| Coating color composition | |
|---|---|
| Sizing agent | 0.16 weight parts |
| Anti-static agent (Chemistat 6120 produced by Sanyo Kasei Kabushiki Kaisha) | 4 weight parts |
| Aqueous polyolefin dispersion | 6 weight parts |
| Water | 120 weight parts |

A white gravure ink (PXAO-white 665 produced by Osaka Insatsu Ink Kabushiki Kaisha) was applied to the obverse side of the above-mentioned sheet and then dried to form an undercoat layer of 2 μm as measured after the drying.

Then, a coating color having the following composition was applied to the above-mentioned undercoat layer, followed by drying, whereby a layer as the engraving layer was formed to have a thickness of 10 μm as measured after the drying. This engraving layer had an opacity of 85%.

| Composition of Engraving Layer Material Color | |
|---|---|
| Aqueous polyester resin ( GXW-27, produced by Toyo Boseki Kabushiki Kaisha) | 50 weight parts |
| Aqueous polyurethane resin (AP-40 produced by Dai-nippon Ink Kabushiki Kaisha) | 38.5 weight parts |
| Fluoro-surfactant | 0.08 weight parts |
| Titanium oxide | 13 weight parts |
| Light Calcium carbonate | 5.8 weight parts |
| Water dispersion of titanium oxide | 75 weight parts |
| Anti-static agent (Chemistat 6120 produced by Sanyo Kasei Kabushiki Kaisha) | 3 weight parts |
| Water | 15 weight parts |

The engraving sheet structure thus formed had the same construction as that shown in FIG. 1. An image was formed by engraving from the surface of the engraving layer down to the level of the substrate, and the thus formed image was observed from both sides of the engraving sheet structure. The image could be clearly observed from either side by the light transmitted through the engraving sheet structure. The image also was observed from the surface of the engraving layer under illumination by black light applied to the surface of the engraving layer. The image could be clearly recognized also in this case. The engraving sheet structure was scraped with a nail by no exfoliation of the surface was observed, thus proving sufficiently high abrasion resistance. The image was not easily recognizable when observed with reflected light, and could be clearly recognized only by the light transmitted through the engraving sheet structure.

Ten samples of the described engraving sheet structure were produced with various opacity of the substrate and the engraving layer, and images were engraved in these samples by a card engraving machine. The relationships between the opacity and clarity of image were observed to obtain results as shown in Table 1 below.

TABLE 1

| | Support layer | | Engraving layer | | | |
|---|---|---|---|---|---|---|
| No. | Thickness μm | Opacity % | Thickness μm | Opacity % | Image Clarity | Difference in opacity |
| 1 | 75 | 20 | 7 | 56 | ○ | 36 |
| 2 | 78 | 32 | 9 | 72 | ○ | 40 |
| 3 | 85 | 43 | 10 | 85 | ○ | 42 |
| 4 | 87 | 50 | 12 | 92 | ○ | 42 |
| 5 | 75 | 20 | 5 | 43 | Δ | 23 |

TABLE 1-continued

| | Support layer | | Engraving layer | | | |
|---|---|---|---|---|---|---|
| No. | Thickness µm | Opacity % | Thickness µm | Opacity % | Image Clarity | Difference in opacity |
| 6 | 88 | 65 | 11 | 88 | Δ | 23 |
| 7 | 88 | 68 | 11 | 90 | Δ | 22 |
| 8 | 75 | 20 | 4 | 35 | Δ | 15 |
| 9 | 85 | 43 | 8 | 63 | Δ | 20 |
| 10 | 90 | 88 | 12 | 92 | Δ | 4 |

Difference in opacity = (opacity of engrave layer) − (opaqueness of substrate)
○—Clear image
Δ—Rather clear image
X—Unclear image

Example 2

A bi-axially orientated high-density polyethylene sheet of 75 µm thick was used as a substrate, with a backing layer formed on the reverse side thereof as in the case of Example 1.

Then, a blue gravure ink was applied to the surface of the substrate, followed by drying, thus forming an undercoat layer of 2 µm thick as measured in dried state.

An engraving layer similar to that of Example 1 was formed on the undercoat layer, whereby an engraving sheet structure was obtained. An image was formed by engraving using a card engraving machine from the upper side of the engraving layer down to the level of the substrate, and was observed from both sides of the engraving sheet structure by means of light transmitted through the engraving sheet structure. The image could be recognized clearly from either side of the engraving sheet structure. A white sheet was adhered to the surface of the engraving layer, and the image was observed from the the side opposite to the white sheet, i.e., from the reverse side of the engraving sheet structure. The image could clearly be recognized also in this case.

A plurality of samples of this engraving sheet structure were produced with various combinations of colors of the undercoat layer and the engraving layer as shown in Table 2 below, and images were observed by means of reflected lights and transmitted lights. The image, when observed by the reflected light, showed a color substantially the same as the color of the engraving layer, whereas, when observed with the transmitted light, the image showed a color which is a mixture of the colors of the undercoat layer and the engraving layer, approximating the color of the engraving layer.

Example 3

Three undercoat layers 3 were formed by the same technique as Example 1 on a substrate made of a polyethylene terephthalate film of 75 µm thick, and an engraving layer was formed on the uppermost undercoat layer, whereby an engraving sheet structure was obtained. The construction of this engraving sheet structure, therefore, was of the type shown in FIG. 3. An image was formed from the upper side of the engraving layer down to the level of the substrate. The image could be observed from both sides of the engraving sheet structure. The image could be clearly observed from either side by the light transmitted through the engraving sheet structure. A plurality of samples of this type of engraving sheet structure were produced with various combinations of the colors of the undercoat and the engraving layer, and images were observed by means of reflected lights and transmitted lights to obtain results as shown in Table 3.

TABLE 2

| | Color of undercoat layer | Color of engrave layer | Reflected light | Transmitted light |
|---|---|---|---|---|
| A | Blue | White | White | Blue |
| B | Red | Blue | Blue | Violet |
| C | Yellow | Red | Red | Orange |
| D | Blue | Yellow | Yellow | Green |

TABLE 3

| | Color of undercoat layers | | | Color of engrave layer | Reflected light | Transmitted light |
|---|---|---|---|---|---|---|
| | 1 | 2 | 3 | | | |
| A | Red | Blue | Yellow | White | White | Black |
| B | Red | Blue | Yellow | Red | Red | Black |
| C | Red | Blue | Yellow | Blue | Blue | Black |
| D | Red | Blue | Yellow | Yellow | Yellow | Black |

Example 4

A backing layer was formed on the reverse side of a substrate made of a polyethylene terephthalate film of 75 µm thick by the same technique as Example 1, and a matrix pattern was printed with a white gravure ink on the obverse side of the substrate. An undercoat layer was formed on the printed matrix pattern with the same ink as that used for the printing of the matrix pattern, whereby an engraving sheet structure was obtained. Thus, the engraving sheet structure had a construction of the type shown in FIG. 4. The matrix pattern could not be recognized when observed with reflected lights but could be clearly recognized with lights transmitted through the engraving sheet structure. An image engraved in this engraving sheet structure could be clearly recognized by lights transmitted through the engraving sheet structure.

Example 5

A matrix pattern was printed on the reverse side of a substrate made of a polyethylene terephthalate film of 75 µm thick with white graveur ink and a backing layer was formed on the printed matrix pattern. An undercoat layer was formed on the obverse side of the substrate with white graveur ink, and an engraving layer was formed on this undercoat layer, whereby an engraving sheet structure of the type shown in FIG. 5 was obtained. The matrix pattern could not be recognized with reflected lights but could be clearly observed with transmitted light. An image engraved in this engraving sheet structure could be clearly recognized with lights transmitted through the engraving sheet structure.

Example 6

A polyethylene terephthalate film of 75 µm thick (opacity 20%), treated at its both sides for easy adhesion, was prepared as a substrate, and one side of the substrate was coated with a green gravure ink such that the ink layer had a thickness of 3 µm after drying. In order to provide printing, typing and writing characteristics, a printing layer was formed by applying a coating color having the following composition on the layer of the green engraving ink, such that the printing layer after drying had a thickness of 7 µm.

| Composition of coating color | |
|---|---|
| Aqueous polyester resin (GXW-27 produced by Toyo Boseki Kabushiki Kaisha) | 50 weight parts |

-continued

| Composition of coating color | |
|---|---|
| Aqueous polyurethane resin (Hiland AP-40 produced by Dainippon Ink Kabushiki Kaisha) | 32.5 weight parts |
| Titanium oxide | 40 weight parts |
| Associating thickener 10% solution | 10 weight parts |
| anti-static agent | 5 weight parts |
| Water | 50 weight parts |

An image was engraved by means of a card engraving machine from the upper side of the printing layer, whereby an engraved sheet was obtained. The image could be clearly recognized when viewed from the side opposite to the engraving layer, with light applied from the same side as the engraving layer and transmitted through the engraving sheet structure. Thus, the engraving sheet structure of this Example was of the type shown in FIG. 9.

Comparative Example 1

The image engraved in the engraving sheet structure of Example 6 could not be recognized even with transmitted light, not to mention reflected light, when viewed from the upper side of the engraving layer.

Comparative Example 2

An engraving sheet structure was produced and tested under the same conditions as Example 6 except that a sheet of white polyethylene terephthalate (opacity 98%) was used as the substrate. In this case, the engraved image could not clearly recognized.

Example 7

A transparent polyethylene terephthalate film similar to that employed in Example 6 was used as the substrate, and a blue colored layer was formed on the transparent polyetylene terephthalate film. A printing layer of 5 μm thick was formed on the side of the substrate opposite to the colored layer by applying a coating color of the following composition and then drying it.

| | |
|---|---|
| Aqueous polyester resin (Byronal MD-1200 produced by Toyo Boseki Kabushiki Kaisha) | 50 weight parts |
| Polyvinyl acetal resin | 10 weight parts |
| Associating thickener | 5 weight parts |
| Fine powder of silica | 10 weight parts |
| Light calcium carbonate | 10 weight parts |
| Anti-static agent | 4 weight parts |
| Aqueous polyolefin dispersion | 6 weight parts |
| Water | 120 weight parts |

An image was engraved in this engraving sheet structure from the upper side of the colored layer by using a card engraving machine. The image could be clearly recognized when viewed from the same side as the printing layer with transmitted light. The opacity of the laminate structure composed of the substrate and the printing layer was 43%.

Then, a white sheet having a brightness higher than the colored layer was adhered to the colored layer of the above-described engraving sheet structure. The engraved image could be clearly recognized when viewed from the same side as the print layer with reflected lights. Thus, the engraving sheet structure of this Example was of the type shown in FIG. 10.

Comparative Example 3

The white sheet employed in Example 7 was substituted by a sheet of the same color as the engraving layer. In this case, the engraved image could not be recognized clearly. The image was further made unclear when the above-mentioned sheet was replaced with a black sheet.

Example 8

A transparent bi-axially orientated high-density polyethylene sheet (Rupic T/D, 60 μm thick, produced by Tonen Sekiyu Kagaku Kabushiki Kaisha) was used as the substrate. The substrate was coated at its one side with an undercoating color (Lamistar, a two-liquid mixture containing fine powder of silica, produced by Toyo Ink Kabushiki Kaisha). The coat layer after drying had a thickness of 2 μm. Black color printing of 4 μm was formed by screen printing method using two-liquid setting ink. An image engraved in this engraving sheet structure could be clearly recognized. A plurality of this engraving sheet structures were bound by sewing to form a book similar to a passport and thus formed book was subjected to 300 opening and closing cycles. The sewing perforations were not substantially expanded. The surface layer was treated with toluene but no substantial change was caused although the substrate swelled.

Example 9

A transparent bi-axially orientated high-density polyethylene sheet (Rupic L, 60 μm thick, produced by Tonen Sekiyu Kagaku Kabushiki Kaisha) was used as the substrate, and an undercoating color (Acronal YJ 2721D produced by Mitsubishi Yuka Bardisk Co., Ltd.) was applied to the substrate by an amount of 1 g/m$^2$ in terms of dry weight, thereby forming an undercoat layer. A coating color having the following composition was applied to the undercoat layer and then dried to form an engraving layer.

| Composition of coating color | |
|---|---|
| Acrylic emulsion (Acronal S-8865 produced by Mitsubishi Yuka Bardish Co., Ltd.) | 50 weight parts |
| Calcium carbonate | 100 weight parts |
| Titanium white | 10 weight parts |
| Dispersion agent | 0.5 weight parts |
| Anti-foaming agent | 0.1 weight parts |
| Mildewproofing agent | 0.2 weight parts |
| Ultraviolet absorbent | 0.2 weight parts |

The engraving layer after drying had a thickness of 35 μm.

A fine matrix pattern was printed leaving blanks for engraving of image and signature with, for example, a ball-point pen or a fountain pen. A plurality of such engraving sheet structures were bound in a manner like a bankbook and images were engraved in this book. The engraved images could be recognized clearly. The book also was subjected to 300 opening and closing cycles, as well as tests for confirming abrasion resistance, anti-embossing characteristic and light fastness, and good result was confirmed in each test.

Example 10

A transparent non-orientated polyester film of 200 μm thick was used as the substrate. The coating color used in Example 1 for forming the backing layer was applied to the reverse side of this substrate as in the case of Example 1, followed by drying, thus forming a backing layer of 10 μm thick as measured in dried state. Then, the coating solution used in Example 1 for forming the engraving layer was applied to the obverse side of this substrate as in the case of Example 1, followed by drying, thus forming an engraving layer of 10 μm thick as measured in dried state, whereby a graving sheet of the type shown in FIG. 11 was obtained.

Image was formed by engraving from the upper surface of the engraving layer down to the level of the substrate by mans of a card engraving machine. The image could be formed with a high degree of reproducibility of gradation. The image was observed from the same side as the engraving layer and from the side opposite to the engraving layer. The image could be clearly recognized in each case. Although the sheet surface was scratched with a nail, no exfoliation or drop of the image was observed.

What is claimed is:

1. An engraving sheet structure, comprising: a substrate made of a plastic sheet having an opacity not greater than 70%, and an engraving layer formed on said substrate and having an opacity not less than 40%; wherein the opacity of said substrate is lower than that of said engraving layer and the difference in the opacity between said substrate and said engraving layer is not less than 30%, said engraving layer being adapted to be engraved to form an image from its surface down to the level of said substrate.

2. An engraving sheet structure according to claim 1, further comprising a colored layer disposed between said substrate and said engraving layer and having a color different from those of said substrate and said engraving layer.

3. An engraving layer according to claim 2, wherein said colored layer is composed of a plurality of layers.

4. An engraving sheet structure according to claim 1, wherein said engraving layer is colored.

5. An engraving sheet structure according to any one of claims 1 to 4, wherein said image is observable from the side of said engraving sheet structure opposite to said engraving layer.

6. An engraving sheet structure according to any one of claims 1 to 4, wherein said image is observable mainly by light transmitted through said engraving sheet structure.

7. An engraving sheet structure according to any one of claims 1 to 4, further comprising a printing layer or a matrix pattern layer formed on said engraving layer so that said image is formed by engraving conducted through said printing layer or said matrix pattern layer.

8. An engraving sheet structure according to claim 4, wherein said engraving layer after engraving is adapted to be overlain by a colored layer adhered thereto and having a color different from that of said engraving layer.

9. An engraving sheet structure according to claim 7, further comprising a colored sheet having a color different from that of said engraving layer and adhered to said printing layer or said matrix pattern layer.

10. An engraving sheet structure according to one of claims 8 and 9, wherein said colored sheet has a greater lightness than said engraving layer.

11. An engraving sheet structure according to claim 1, further comprising a backing layer provided on the reverse side of said substrate.

12. An engraving sheet structure according to claim 1, wherein said substrate is made of a bi-axially orientated high-density polyethylene sheet.

13. An engraving sheet structure according to claim 1, wherein said engraving layer comprises a cross-linkable binder.

* * * * *